Patented Apr. 18, 1950

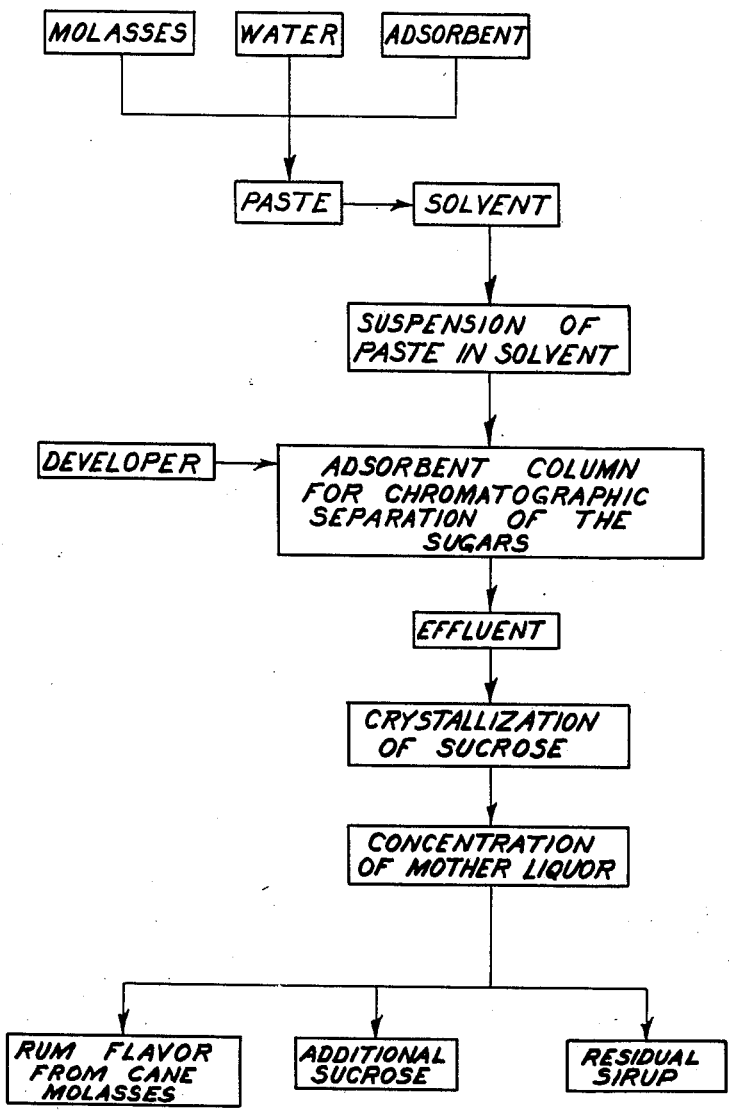

2,504,169

UNITED STATES PATENT OFFICE 2,504,169

CHROMATOGRAPHIC SEPARATION OF CARBOHYDRATES

Melville L. Wolfrom and Wilfred Wendell Binkley, Columbus, Ohio, assignors to Ohio State University Research Foundation, Columbus, Ohio, a corporation of Ohio Application September 27, 1946, Serial No. 699,662

11 Claims. (Cl. 127—55)

This application relates to a process for the separation of sugars and some related substances. The process is specifically described as a process of the recovering of sucrose and flavor constituents from molasses but although the process is particularly useful in this connection, its use is not confined thereto. However, the invention thus specifically contemplates a new process for the recovery of sucrose from molasses. It constitutes an improvement on the development disclosed in a prior application of Melville L. Wolfrom and Baak W. Lew, Serial No. 679,495, filed June 26, 1946.

The recovery of sucrose from the juices of the two main plant sources, the sugar cane and the sugar beet has heretofore usually been by a more or less complicated process including crystallization by evaporation under reduced pressures of the sucrose from the sugar cane and sugar beet juices. It constitutes a major industry. After all of the sucrose which it is feasible to remove by such processes has been removed, there remains a mother liquor which on further concentration is known as molasses. Heretofore, there has been no serious attempt to recover further amounts of sucrose from the molasses from the sugar cane (commonly known as blackstrap), that product being used mainly as a source for alcohol. It has not been unusual, however, to further process the sugar beet molasses by separating therefrom a chemical derivative of the sucrose (generally as a metallic saccharate), and thereafter regenerating the sucrose from the sucrose derivative.

By the term "sugar related substances" as used above and below in this specification and in the claims we mean the following and so define "sugar related substances" as used in this specification and claims. "Sugar related substances" is defined as the simpler carbohydrates such as monosaccharides, di-saccharides, and tri-saccharides and other substances such as flavor fractions, terpenes, sterols, and fat fractions often associated with the simpler carbohydrates in natural juices.

It is an object of this invention to provide a new and improved method of separating "sugar related substances."

A further object of the invention is the provision of a method for recovering further amounts of sucrose from blackstrap or sugar beet molasses.

A further object of the invention is a provision of a new and improved process of chromatography of "sugar related substances."

A feature of the invention is the method in chromatographic recovery of "sugar related substances" comprising the steps of mixing the substances which are to be separated with a quantity of adsorbent, suspending the paste thus formed in a solvent, adding the suspended paste and solvent to the top of a chromatographic column, and thereafter separating the desired fraction from the column by the use of a suitable developer.

A further feature of the invention is the separation of various fractions of the molasses chromatographically.

A further feature of the invention is the separation of the fractions of the molasses having the rum-like odors from the other fractions of the molasses.

Further objects and features of the invention will be apparent from a reading of the subjoined specification and claims when considered in connection with the accompanying drawings illustrating a process of "sugar related substance" separation embodying one form of our invention.

The drawings comprise a flow sheet illustrating a process embodying our invention.

In general the process illustrating our invention herein disclosed and described consists of mixing or adsorbing the substance to be separated with or on a suitable adsorbent as, for example, of the character hereinafter listed, suspending the mixture in a solvent, adding the suspension to the top of a chromatographic column, then developing the chromatogram with a suitable developer so that the effluent may be removed in a series of fractions each having its own special characteristics and if desirable crystallizing certain of the fractions. It may here be noted that the obvious method of simply adding the molasses to the top of the chromatographic column and then developing by the use of a suitable solvent (i. e. omitting the pasting step) is not nearly as desirable, satisfactory or efficient as the method herein described.

Referring in detail to the drawings it may be seen that the process shown in the flow sheet in illustration of our invention comprises the mixing of either sugar cane (blackstrap) molasses or sugar beet molasses with or without dilution with water with a suitable adsorbent which may be a native clay; the suspension in a suitable solvent, as for example, ethanol; the addition of the paste thus formed to the top of a chromatographic column which may consist of a mixture of a native clay and a filter aid; the developing of the column by pouring therethrough a measured quantity of a suitable developer such as, for example, a mixture of ethanol and water to develop off a first fraction; similarly developing additional fractions into separate containers; and crystallizing substantially pure sucrose from one or more of these fractions. By these methods we are able to separate from molasses approximately three-fourths or more of the sucrose present in the molasses. For example, from the effluent, the sucrose is readily crystallized by evaporation as a colorless high purity product. It is not necessary that the sucrose be collected in as large a number of fractions as shown hereinafter in the examples.

In further explanation of our invention, we submit a series of examples.

EXAMPLE I 50 g. of cane blackstrap molasses containing 82.3% solids, 5.5% ash, 32% sucrose, and 15% reducing sugars (as invert sugars) was diluted with 25 ml. of distilled water. A smooth paste was then prepared by the addition of 25 g. of a mixture of 5 parts (by wt.) of native clay and 1 part of filter aid to the diluted molasses. This paste was suspended employing good agitation in 500 ml. of absolute ethanol. The molasses, clay, filter aid and ethanol suspension was added to the top of a 7-9 by 11-12 cm. column of a mixture of 250 g. of 5 to 1 clay and filter aid in a 2 liter column arranged to permit the collection of the effluent without interfering with the operation of the column. The chromatogram was developed with three liters of 95% ethanol (the azeotrope). A total of 11.87 g. of sucrose (74.2% of that present) of excellent purity was obtained on concentration of the effluent. The residual sirup obtained on solvent removal was sweet and highly palatable. The nature of the effluent was investigated by collection in nine fractions, data on which are given in Table I. Fraction 2 was light green in color; fractions 3 to 8 were a golden color; fractions 8 and 9 were nearly colorless. Fractions 2, 3 and 4 had a strong, pleasant, rum-like odor and it was obvious that the characteristic flavoring substances were concentrated therein. The other fractions had virtually no odor. The residual sirups obtained on solvent removal were sweet and highly palatable.

TABLE I

*Effluent fractions from the chromatogram of molasses on clay*

| Type of Molasses | Fraction | Volume of fraction, ml. | Solids in fraction, g. | Sucrose | | | | |
|---|---|---|---|---|---|---|---|---|
| | | | | First Crop | | | Second Crop | |
| | | | | G. | M. P., °C. | $[\alpha]_D^{20}$, c 5 water | G. | $[\alpha]_D^{21}$, c 5 water |
| Cane blackstrap | 1 | 450 | 0.3 | | | Degrees | | Degrees |
| | 2 | 260 | 0.3 | | | | | |
| | 3 | 130 | 0.6 | | | | | |
| | 4 | 290 | 5.9 | 2.74 | | | 0.11 | |
| | 5 | 310 | 6.7 | 2.91 | 180-182 | +66.5 | 0.17 | |
| | 6 | 400 | 6.5 | 2.80 | | | 0.16 | |
| | 7 | 370 | 3.7 | 1.00 | 179-181 | | 0.45 | |
| | 8 | 180 | 1.0 | 0.07 | | | 0.37 | |
| | 9 | 1,280 | 2.4 | 1.09 | 180-182 | | | |
| Total | | 3,670 | 27.4 | 10.01 | [1] 180-182 | +65.9 | 1.26 | +65.0 |

[1] Mixed melting point with sucrose (M. P. 180-182°) of complete samples: 180-182°.

EXAMPLE II

Fifty grams of beet molasses containing 81.2% solids, 2.0% ash, 46.6% sucrose, and 2.2% raffinose was mixed with or adsorbed on 30 g. of clay as described above in Example I; the clay being a mixture of 50 parts of clay and 1 part of filter aid. This mixture or paste was then suspended with good agitation in 500 ml. of absolute ethanol. The suspension was then added to the top of 7-9 by 11-12 cm. column of a mixture of 250 g. of 5 to 1 clay to filter aid in a two liter column arranged to permit the collection of the effluent without interfering with the operation of the column. The cromatogram was developed with three liters of 95% ethanol. A total of 21.7 g. of sucrose (93.3% of that present) of excellent purity was obtained on concentration of the effluent. The effluent was collected in eleven fractions. Data on these fractions are listed in Table II. Fractions two and three of Table II had a strong, unpleasant odor characteristic of beet molasses; all of the fractions were nearly colorless. The residual sirups obtained on complete solvent removal were unpalatable.

TABLE II

*Effluent fraction from chromatogram of molasses on clay*

| Type of Molasses | Fraction | Volume of fraction, ml. | Solids in fraction, g. | Sucrose | | | | |
|---|---|---|---|---|---|---|---|---|
| | | | | First Crop | | | Second Crop | |
| | | | | G. | M. P., °C. | $[\alpha]_D^{25}$ c 5 water | G. | $[\alpha]_D^{25}$ c 5 water |
| | | | | | | Degrees | | Degrees |
| Beet | 1 | 270 | 0.2 | | | | | |
| | 2 | 190 | 0.2 | 0.05 | | | | |
| | 3 | 200 | 0.2 | 0.15 | 180–182 | | 0.05 | |
| | 4 | 210 | 1.4 | 0.30 | | | 0.44 | |
| | 5 | 230 | 2.8 | 1.44 | 180–182 | | 0.68 | |
| | 6 | 390 | 4.9 | 2.92 | 180–182 | +66.7 | 0.90 | |
| | 7 | 470 | 5.5 | 2.70 | 180–182 | | 2.46 | |
| | 8 | 360 | 5.3 | 1.89 | | | 1.87 | |
| | 9 | 350 | 3.9 | 1.00 | 180–182 | | 1.97 | |
| | 10 | 350 | 2.6 | 1.70 | | | | |
| | 11 | 880 | 1.9 | 1.21 | 180–182 | | | |
| Totals | | 3,900 | 28.9 | 13.36 | ¹ 180–182 | +66.5 | 8.37 | +64.0 |

¹ Mixed melting point with sucrose (M. P. 180–182°) of composite samples: 180–182°.

EXAMPLE III

Two hundred and twenty-five grams of cane blackstrap molasses was diluted with 100 ml. of distilled water and a smooth paste prepared by the addition of 125 g. of a mixture of five parts of clay and one part of filter aid. This paste was suspended with good agitation in two liters of absolute ethanol and added to the top of a 7–9 by 11–12 cm. column of a mixture (250 g.) of 5 to 1 clay and filter aid. The chromatogram was developed with one liter of 95% ethanol. The effluent was concentrated under reduced pressure (heating bath at 48–50° C.) to a viscous sirup. The water-soluble portion of this sirup was transferred with distilled water (60–80 ml.) to a liquid-liquid extractor, and extracted for 12 hours with petroleum ether. A portion of the extraction solvent was used to rinse out the distillation flask before the extraction started. The average yield of extracted material was 1.2 g. It was nearly solid, dark green in color, with a strong odor of cane blackstrap molasses.

*Developers, solvents and adsorbents*

As a solvent, we prefer to use a solvent selected from the class consisting of water soluble alcohols, water soluble ethers, and water soluble heterocyclic compounds. We have found that the following solvents are useful as solvents and developers in separating sugar from molasses under the process described above although some of these solvents are much better than others as is shown in Table III attached hereto: methanol, ethanol, 1-propanol, 2-propanol, methyl Cellosolve, ethyl Cellosolve, tetrahydrofurfuryl alcohol, dioxane, morpholine, pyridine. Many adsorbents of the fuller's earth type of native clay were tested and found to be suitable and useful in separating sucrose from molasses (whether cane black strap molasses or beet molasses) as were also hydrated magnesium acid silicate, hydrated calcium acid silicate, alumina, silica gel and magnesium silicate. Of the adsorbents tested we standardized our experiments on a native clay which had been subjected to a suitable heat treatment. However, various types of clay whether dry or activated (e. g. hydrated aluminum silicates often containing some potassium and sodium silicate in chemical combination), were found to be useful and suitable.

TABLE III

*Desugaring molasses with different developers*

| Solvent | Solvent/water volume ratio | Desugaring value |
|---|---|---|
| methanol | 95/5 | good. |
| ethanol | 95/5 | Do. |
| 1-propanol | 90/10 | Do. |
| 2-propanol | 90/10 | Do. |
| methyl Cellosolve | 90/10 | Do. |
| ethyl Cellosolve | 90/10 | Do. |
| tetrahydrofurfuryl alcohol | 90/10 | poor. |
| dioxane | 90/10 | good. |
| morpholine | 95/5 | poor. |
| pyridine | 95/5 | good. |

Methyl Cellosolve, ethyl Cellosolve and other Cellosolves are usually classified as water soluble ethers, in spite of the fact they also have a hydroxyl group and we have, therefore, considered them herein and in the claims hereof as coming under the class of water soluble ethers.

The recovery of sucrose from molasses by the reuse of a column which has been previously used and purged with water and allowed to dry in air at room temperature was highly satisfactory.

Referring again to Table I, we prefer for commercial applications of our invention to recover the portions of the cane molasses in three fractions such as, for example: A (fraction 1 of Table I) which can be reused as a developer; B (fractions 2 and 3 or fractions 2, 3 and 4) which is useful as a flavoring material; and C (fractions 4–9 incl. or 5–9 incl.) which is further processed to recover the sucrose by crystallization. It is to be understood, however, that we may separate the molasses into more and/or different fractions before evaporation as may seem most desirable.

Similarly in separating beet molasses, although we may separate into more and/or different fractions before evaporation, we prefer to separate only into a fraction containing that designated as fraction 1 of Table II for reuse as developer and a fraction containing that designated as fractions 2–11 inclusive, of Table II for crystallization.

The residue after crystallization, especially in the case of the cane sugar fractions, is a palatable sirup in the nature of a molasses.

It is to be understood that the above described embodiments of the invention are for the pur-

We claim:

1. A process for the separation of a sugar from related substances comprising the steps of adding a substance to be separated to an adsorbent to form a paste; suspending the paste in a solvent selected from the group consisting of water soluble alcohols, water soluble ethers, and water soluble heterocyclic compounds; adding the suspension to the top of a column of adsorbent; and developing the chromatogram with a solvent comprising a mixture of water and a water miscible solvent selected from the class consisting of water soluble alcohols, water soluble ethers, and water soluble heterocyclic compounds so as to flow a separated portion of sugar therefrom.

2. A process for the separation of sugar related substances comprising the steps of adding a molasses to a fuller's earth type clay adsorbent to form a paste; suspending the paste in a water soluble alcohol; adding the suspension to the top of a column of fuller's earth type clay adsorbent; and developing the chromatogram with a solvent consisting of a mixture of water and a water-miscible alcohol so as to flow a separated portion of the sugar related substance therefrom.

3. A process for the separation of sugar from source impurities comprising the steps of adding a mixture of the sugar and the other substances to an adsorbent comprising a mixture of clay and filter aid to form a paste; suspending the paste in a water-miscible solvent selected from the class consisting of water soluble alcohols, water soluble ethers, and water soluble heterocyclic compounds; adding the suspension to the top of a column of adsorbent comprising a mixture of clay and filter aid; and developing the chromatogram with a water-miscible solvent selected from the group consisting of water soluble alcohols, water soluble ethers, and water soluble heterocyclic compounds so as to flow a separated portion of the sugar and separated portions of the associated substances therefrom.

4. A process of securing the rum flavor portion of molasses which comprises adding a mixture comprising molasses, water, an adsorbent and a solvent selected from the class consisting of water soluble alcohols, water soluble ethers, and water soluble heterocyclic compounds to the top of an adsorbent column; developing the mixture by adding thereto a developer selected from the class consisting of water soluble alcohols, water soluble ethers, and water soluble heterocyclic compounds; removing the effluent therefrom in fractions; and separating those fractions which contain the most pronounced rum-like odors.

5. A process of obtaining the odor fractions of a molasses which comprises suspending a mixture of the molasses in a solvent selected from the class consisting of water soluble alcohols, water soluble ethers, and water soluble heterocyclic compounds; adding the mixture to the top of a chromatographic column of fuller's earth type native clay adsorbent, and developing the chromatogram with a mixture of water and a water-miscible solvent developer selected from the class consisting of water soluble alcohols, water soluble ethers, and water soluble heterocyclic compounds to secure separated fractions; and concentrating a fraction of the effluent under reduced pressure to a viscous sirup.

6. A process for the separation of sugar from other sugar related substances with which it is mixed comprising the steps of adding a mixture of sugar and such other sugar related substances with a fuller's earth type native clay adsorbent to form a paste; suspending the paste in a water-miscible solvent selected from the class consisting of water soluble alcohols, water soluble ethers and water soluble heterocyclic compounds; adding the suspension to the top of a column of fuller's earth type clay adsorbent; and developing a chromatogram with a mixture of water and a water-miscible solvent selected from the class consisting of water soluble alcohols, water soluble ethers and water soluble heterocyclic compounds, so as to flow separated portions of sugar and other sugar related substances separately therefrom.

7. A process for the separation of sugar from other sugar related substances with which it is mixed comprising the steps of adding a mixture of sugar and such other sugar related substances with a fuller's earth type native clay adsorbent to form a paste; suspending the paste in ethanol; adding the suspension to the top of a column of fuller's earth type clay adsorbent; and developing a chromatogram with a mixture of water and ethanol so as to flow separated portions of sugar and other sugar related substances separately therefrom.

8. A process for the separation of sucrose from other sugar related substances with which it is mixed, comprising the steps of adding a mixture of sucrose and such other sugar related substances with a native fuller's earth type clay adsorbent to form a paste; suspending the paste in absolute ethanol; adding the suspension to the top of a column of mixture of five parts of a fuller's earth type clay adsorbent and one part of a filter aid; and developing a chromatogram with a mixture of about 5% water and about 95% ethanol so as to flow a separated portion of sucrose and a plurality of separated fractions of other sugar related substances separately therefrom.

9. A process for the separation of sugar from other sugar related substances with which it is mixed, comprising the steps of adding a mixture of sugar and such other sugar related substances with a fuller's earth type clay adsorbent to form a paste; suspending the paste in isopropyl alcohol; adding the suspension to the top of a column of fuller's earth type clay adsorbent; and developing a chromatogram with a mixture of water and isopropyl alcohol so as to flow separated portions of sugar and such other sugar related substances separately therefrom.

10. A process for securing the rum flavor portion of molasses which comprises adding a mixture comprising molasses, a fuller's earth type clay adsorbent, and a water miscible solvent selected from the class consisting of water soluble alcohols, water soluble ethers, and water soluble heterocyclic compounds in the form of a paste to the top of an adsorbent column of a fuller's earth type clay adsorbent and filter aid; developing a chromatogram by adding thereto a developer consisting of a mixture of water and a water-miscible solvent selected from the class consisting of water soluble alcohols, water soluble ethers, and water soluble heterocyclic compounds; removing the effluent therefrom in fractions; and separating those fractions which contain the most pronounced rum-like odors.

11. A process for securing the rum flavor portion of cane sugar molasses which comprises adding a mixture containing molasses, a fuller's earth type clay adsorbent, and a water-miscible solvent selected from the class consisting of water soluble alcohols, water soluble ethers, and water soluble heterocyclic compounds in the form of a paste to the top of an adsorbent column of fuller's earth type clay adsorbent and filter aid; developing a chromatogram by adding thereto a developer consisting of a mixture of from 5–10% of water and of from 90–95% of a water miscible solvent selected from the class consisting of water soluble alcohols, water soluble ethers, and water soluble heterocyclic compounds; removing the effluent therefrom in fractions; and separating those fractions which contain the most pronounced rum-like odors.

MELVILLE L. WOLFROM.
WILFRED WENDELL BINKLEY.

No references cited.